(12) United States Patent
Yellambalase et al.

(10) Patent No.: US 9,085,210 B2
(45) Date of Patent: Jul. 21, 2015

(54) REACTIVE AIR SUSPENSION SYSTEM

(71) Applicant: Atieva, Inc., Redwood City, CA (US)

(72) Inventors: Yadunandana Yellambalase, Foster City, CA (US); Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 93 days.

(21) Appl. No.: 14/091,792

(22) Filed: Nov. 27, 2013

(65) Prior Publication Data
US 2015/0145220 A1 May 28, 2015

(51) Int. Cl.
| | |
|---|---|
| *B60G 17/0165* | (2006.01) |
| *B60G 17/019* | (2006.01) |
| *B60G 17/018* | (2006.01) |
| *B60G 17/052* | (2006.01) |
| *B60G 17/015* | (2006.01) |

(52) U.S. Cl.
CPC .......... *B60G 17/0165* (2013.01); *B60G 17/018* (2013.01); *B60G 17/019* (2013.01); *B60G 17/0155* (2013.01); *B60G 17/052* (2013.01); *B60G 17/0525* (2013.01); *B60G 2202/152* (2013.01); *B60G 2400/104* (2013.01); *B60G 2400/204* (2013.01); *B60G 2400/252* (2013.01); *B60G 2400/40* (2013.01); *B60G 2400/51222* (2013.01); *B60G 2400/82* (2013.01); *B60G 2400/823* (2013.01); *B60G 2400/842* (2013.01); *B60G 2400/843* (2013.01); *B60G 2500/30* (2013.01); *B60G 2800/914* (2013.01)

(58) Field of Classification Search
CPC .. B60G 17/00; B60G 17/016; B60G 17/0155; B60G 17/0165; B60G 17/0565
USPC ............................................................ 701/37
See application file for complete search history.

(56) References Cited

U.S. PATENT DOCUMENTS

| | | | | |
|---|---|---|---|---|
| 5,450,322 | A * | 9/1995 | Tanaka et al. ................... | 701/37 |
| 6,219,600 | B1 | 4/2001 | Pochmuller | |
| 2009/0033044 | A1 | 2/2009 | Linsmeier | |
| 2010/0152969 | A1 | 6/2010 | Li et al. | |
| 2013/0060423 | A1 | 3/2013 | Jolly | |
| 2014/0195112 | A1* | 7/2014 | Lu et al. .......................... | 701/37 |

FOREIGN PATENT DOCUMENTS

KR        20120050272        5/2012

* cited by examiner

*Primary Examiner* — Paul N. Dickson
*Assistant Examiner* — Robert A Coker
(74) *Attorney, Agent, or Firm* — Patent Law Office of David G. Beck

(57) ABSTRACT

A system that helps to mitigate the risks associated with roadway debris is provided. The system uses an on-board sensor system to detect obstacles within the vehicle's pathway and an on-board controller and air spring suspension system to automatically increase ride height and road clearance when an obstacle is detected, thereby allowing the vehicle to potentially avoid the detected obstacle.

24 Claims, 18 Drawing Sheets

REACTIVE AIR SUSPENSION SYSTEM

FIELD OF THE INVENTION

The present invention relates generally to vehicles and, more particularly, to a system that helps to protect the underside of a vehicle from road debris.

BACKGROUND OF THE INVENTION

Drivers may encounter any of a variety of difficulties during their normal day-to-day commute, some quite inconsequential while others may be life threatening. Many of these problems arise due to simple vehicle malfunctions or driver errors. Driving conditions, especially those encountered during extreme weather, may also lead to an accident. Road debris is another leading cause of vehicle damage which, in many instances, may lead to a significant accident as a driver reacts to the debris and/or damage to their car.

While a conventional car is clearly susceptible to being damaged by road debris, hybrid and all-electric vehicles offer a unique challenge due to their inclusion of a rechargeable battery pack. Rechargeable batteries tend to be relatively unstable and prone to thermal runaway, an event that occurs when a battery's internal reaction rate increases to such an extent that it is generating more heat than can be withdrawn. If the reaction rate and generation of heat go unabated, eventually the heat generated becomes great enough to cause the battery and materials in proximity to the battery to combust. While thermal runaway is typically the result of a battery short or a manufacturing defect, damage such as that which may occur during an accident or when road debris dents or punctures the battery pack may also lead to a thermal runaway event.

Due to the risk of a battery pack fire, hybrid and electric vehicle (EV) manufacturers use a variety of techniques to shield their battery packs from the possible damage that may result from road debris or a vehicle collision. For example, in a vehicle using a relatively small battery pack such as a hybrid, the pack may be protected by placing it within the rear trunk, behind the rear seats, under the front seats, or in another comparatively well protected location. Vehicles utilizing large battery packs typically are forced to mount the pack under the car. To protect such a pack, a ballistic shield may be located between the road surface and the bottom of the pack as disclosed in U.S. Pat. Nos. 8,286,743 and 8,393,427.

Although the prior art teaches a variety of mounting techniques that can either be used to place the battery pack in a relatively protected region of a car or to otherwise shield the battery pack from potential harm, given the severity of the consequences accompanying a catastrophic battery pack event, further techniques for protecting an under-carriage mounted battery pack are desired. The present invention provides such a protection scheme.

SUMMARY OF THE INVENTION

The present invention helps to mitigate the risks associated with roadway debris by detecting obstacles within the vehicle's pathway and automatically raising the vehicle in order to avoid, or at least mitigate, damage as the vehicle passes over the obstacle. The avoidance system of the invention utilizes a plurality of air springs, coupled to an air supply system, that are configured to provide a range of vehicle ride heights as the air pressure within each of the air springs is varied. A controller coupled to both an obstacle sensor and a control valve system is configured to automatically increase the vehicle's ride height, assuming the vehicle's ride height is not already set at its maximum height, in response to a control signal from the obstacle sensor when the sensor detects an obstacle. The obstacle sensor may be configured to output a first control signal when the obstacle is less than a preset size and a second control signal when the obstacle is greater than the preset size, and the controller may be configured to increase the vehicle ride height to a first height in response to the first control signal and to a second height in response to the second control signal.

The air supply system, which includes an air compressor, may be comprised of a single pressured air supply tank coupled to each of the air springs; alternately, comprised of a first pressurized air supply tank coupled to a first pair of air springs (e.g., corresponding to the left and right front wheels) and a second pressurized air supply tank coupled to a second pair of air springs (e.g., corresponding to the left and right rear wheels); alternately, comprised of a first pressurized air supply tank coupled to a first air spring, a second pressurized air supply tank coupled to a second air spring, a third pressurized air supply tank coupled to a third air spring, and a fourth pressurized air supply tank coupled to a fourth air spring.

In another aspect of the invention, the controller may be coupled to an audible and/or visual warning indicator and the system may further include a vehicle speed sensor, a vehicle turning radius sensor, and/or an ambient temperature sensor. The controller may be configured to activate the warning indicator, i.e., the audible and/or visual indicator, if the current vehicle speed exceeds a preset speed, or if the current vehicle turning radius is less than a preset turning radius, or if the combination of current vehicle speed and turning radius exceeds a threshold value, or if the current ambient temperature is less than a preset temperature. The controller may be configured to activate the warning indicator, i.e., the audible and/or visual indicator, and bypass adjustment of the control valve system if the current vehicle speed exceeds a preset speed, or if the current vehicle turning radius is less than a preset turning radius, or if the combination of current vehicle speed and turning radius exceeds a threshold value, or if the current ambient temperature is less than a preset temperature.

A further understanding of the nature and advantages of the present invention may be realized by reference to the remaining portions of the specification and the drawings.

DESCRIPTION OF THE SPECIFIC EMBODIMENTS

In order to drive safely, it is imperative that a driver quickly identify obstacles within their vehicle's pathway, determine the approximate size of the obstacle as well as the likelihood of the obstacle interacting with the car, and then react accordingly. Depending upon the obstacle's size, location and likelihood of vehicle damage, the driver may be required to either stop or swerve in order to avoid running over the obstacle. Unfortunately, in some instances it may be either impossible or unsafe to stop or avoid the obstacle, either due to traffic conditions or insufficient time to react. The present invention helps mitigate these risks by automatically detecting potentially damaging obstacles within the vehicle's pathway and automatically raising the vehicle in order to avoid, or at least mitigate, damage due to the vehicle passing over the obstacle.

Figure 1:
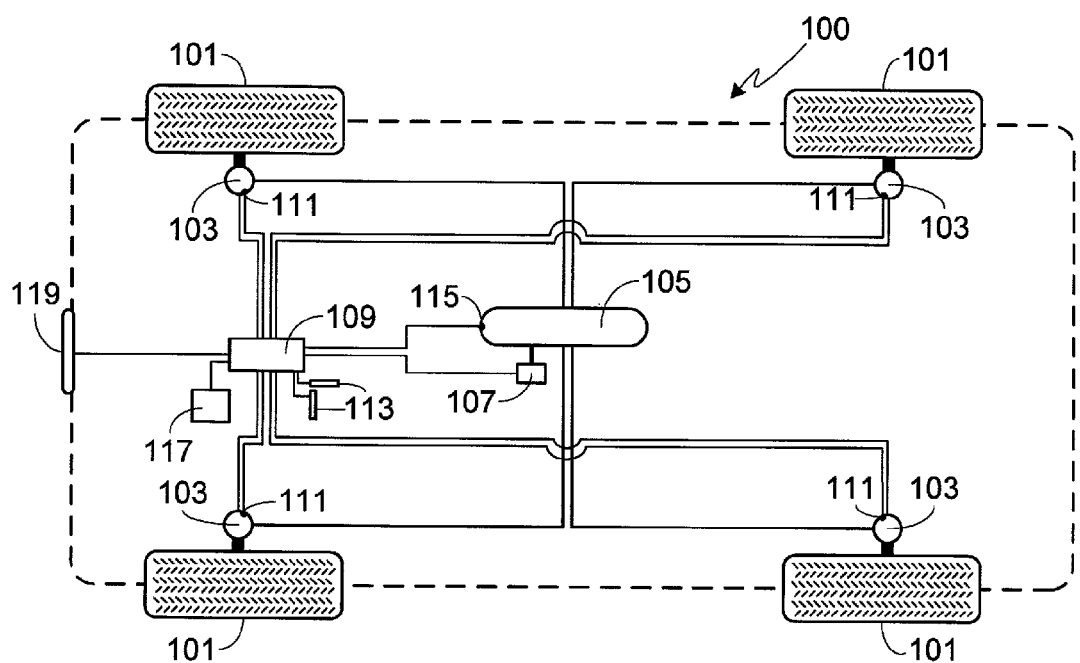
FIG. 1 provides a block diagram of a reactive air suspension system in accordance with the invention.

FIG. 1 provides a block diagram of a reactive air suspension system 100 in accordance with the present invention. Associated with each wheel 101 is an air spring 103 that sets the ride height of the vehicle. Note that an air spring is different from an air-damped shock absorber in that the former can be adjusted to alter ride height while the latter is adjusted to alter ride quality, i.e., to dampen the shock impulses that pass through the vehicle and that arise when the car is on a non-smooth surface. It should be understood that the invention is not limited to a particular type of air spring or air spring configuration.

A pressurized air supply tank 105 is coupled to each of the air springs 103 and supplies the air required by each of the springs. The air within air tank 105 is replenished, as necessary, with an air pump 107. As is well known by those in the industry, various regulators and valves are used to control the flow of air from compressor 107 to air supply 105, and from air supply 105 to each of the air springs 103.

Air springs 103 are coupled to a controller 109. Controller 109 sets the pressure within each spring 103, and therefore is used to adjust the vehicle's ride height. Although there are a variety of techniques that may be used to monitor the air springs and the vehicle's ride height, in at least one configuration controller 109 monitors a pressure sensor 111 within each air spring 103. Controller 109 may also monitor one or more level sensors 113 to insure that as the air pressure within each of the air springs is adjusted, the vehicle remains level. Preferably controller 109 also monitors a pressure sensor 115 within pressurized air tank 105, thus allowing the controller to determine when it is necessary to operate compressor 107 in order to insure a minimum pressure within supply 105.

Although operation of the air suspension system may be completely automated, in at least one embodiment the user is able to manually adjust ride height using a user interface 117 coupled to controller 109. Manual ride height adjustment may be used by the driver to avoid damaging the underside of the car when undergoing a steep change in incline, for example when entering a garage, or passing over a series of speed bumps.

In accordance with the invention, coupled to controller 109 is a sensor 119 that monitors the roadway in front of the car and provides real time detection of road debris and other obstacles that are too large to pass unchecked under the car at the car's current ride height. It will be appreciated that the invention is not limited to a particular type of sensor 119. For example, sensor 119 may utilize a radar-based sensor, a lidar-based sensor, a camera operating in the visible spectrum, a camera operating in the infrared spectrum, or other sensor type. The obstacle detection system may use a stereo-vision-based detection algorithm, a v-disparity algorithm, or other algorithm to determine when the height of a detected obstacle is more than a preset distance above the road surface. Sensors and sensor systems of this type are in use in a variety of applications, including as a means of controlling an autonomous car, commonly referred to as a smart car. Preferably sensor 119 is configured to differentiate between road obstacles that are non-uniform, i.e., that extend above the plane of the road, and road obstacles that are continuous and uniform, such as a speed bump that extends across the width of the road.

Figure 2:
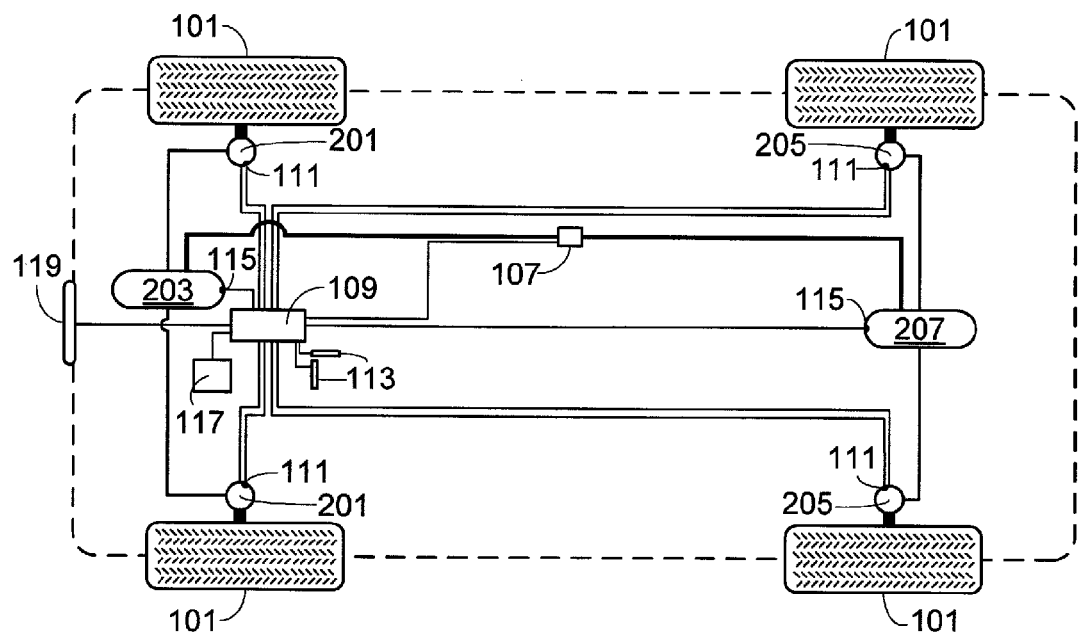
FIG. 2 provides a block diagram of an alternate reactive air suspension system.
Figure 3:
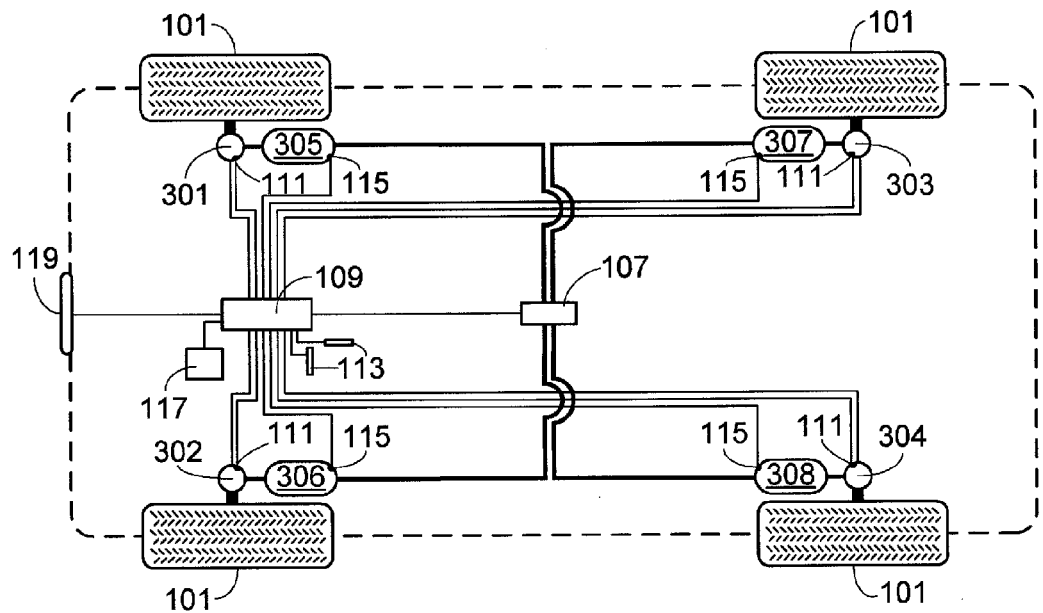
FIG. 3 provides a block diagram of an alternate reactive air suspension system.

As previously noted, the present invention is not limited to use with a single air spring configuration. For example, FIG. 2 illustrates a modification of the system shown in FIG. 1 in which the front vehicle air springs 201 are coupled to a first pressurized air tank 203 while the rear vehicle air springs 205 are coupled to a second pressurized air tank 207. Alternately, each of the air springs 301-304 may be coupled to a corresponding pressurized air tank 305-308 as illustrated in FIG. 3.

Figure 4:
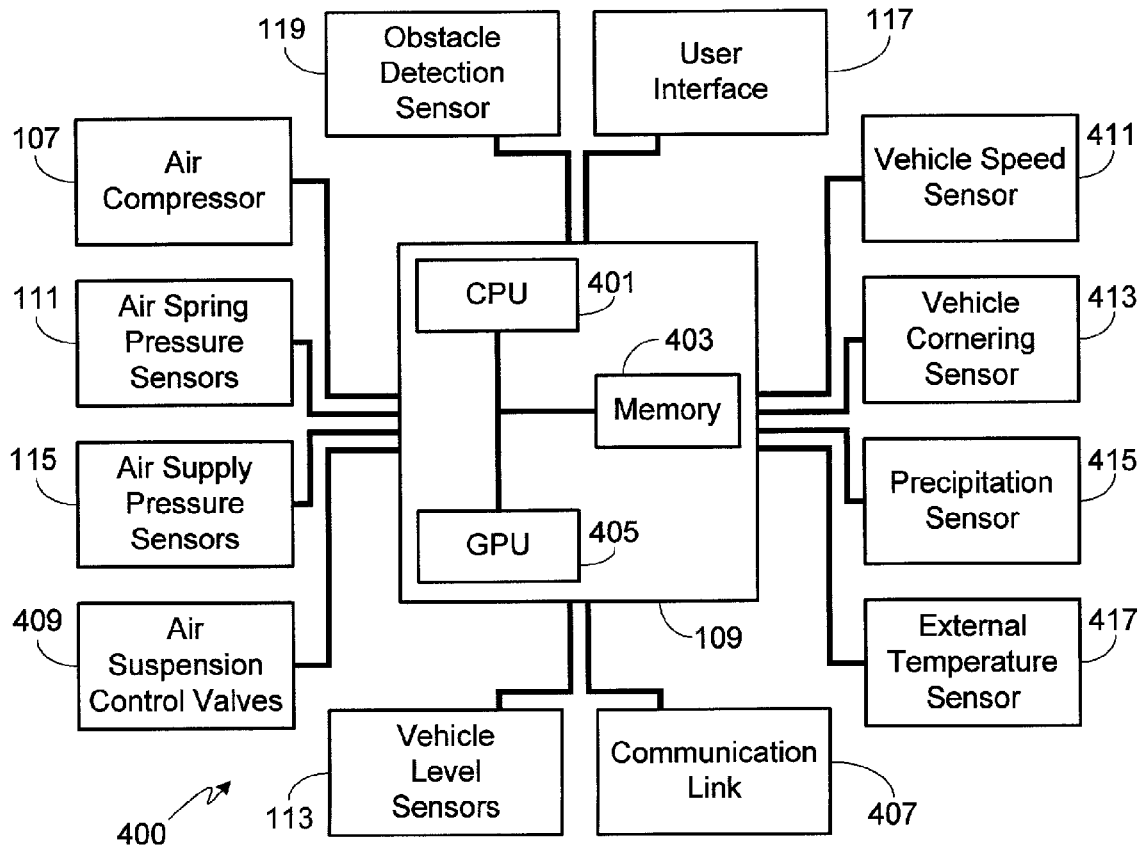
FIG. 4 provides a block diagram of an exemplary control system for use with a preferred embodiment of the invention.

FIG. 4 is a block diagram of an exemplary control system 400 for use with a preferred embodiment of the invention. While the invention is preferably used with an electric or hybrid vehicle in which the battery pack is mounted underneath the car, thus making the pack more susceptible to damage when the car passes over an obstacle in the roadway, it will be appreciated that the invention may be used with any vehicle to help prevent, or at least mitigate, damage from road debris. Of course it should be understood that control system 400 is but one possible configuration and that other configurations may be used while still retaining the functionality of the invention. Additionally, one or more of the elements shown in FIG. 4 can be grouped together in a single device, and/or circuit board, and/or integrated circuit.

In system 400, system controller 109 includes a central processing unit (CPU) 401 and a memory 403. Memory 403 may be comprised of EPROM, EEPROM, flash memory, RAM, a solid state disk drive, a hard disk drive, or any other memory type or combination of memory types. Depending upon the type of interface 117 used with the system, for example a touch-screen or similar display means, controller 109 may also include a graphical processing unit (GPU) 405. CPU 401 and GPU 405 may be separate or contained on a single chip set.

As noted above, controller 109 is coupled to a variety of air suspension components, thus allowing controller 109 to regulate vehicle height based on current driving conditions and/or user preferences. Controller 109 may also be used to monitor and/or control a variety of other vehicle functions, e.g., HVAC system operation, audio system operation, vehicle lights, general vehicle operation, etc. In at least one embodiment, controller 109 is coupled to a telecommunications link 407, thus providing a means for controller 109 to receive configuration updates from an external data source (e.g., manufacturer, dealer, service center, web-based application, remote home-based system, etc.). Mobile telecommunications link 407 may be based on any of a variety of different standards including, but not limited to, GSM EDGE, UMTS, CDMA2000, DECT, and WiMAX.

Controller 109 is coupled to air compressor(s) 107, air pressure sensors 111/115, and one or more control valves 409 that determine the air pressure within each air spring, e.g., air springs 103, 201/205, 301-304, etc. Valves 409 include bleed valves that allow the air pressure within the air springs to be decreased as well as valves that admit air from the pressurized air supply tanks. Note that although not preferred, the system can also be configured to directly couple the air springs to the air compressors.

As previously described, in at least one embodiment controller 109 is coupled to one or more vehicle level sensors 113, thus allowing the controller to insure that the vehicle remains level as the ride height is adjusted. In some embodiments, described in detail below, controller 109 may modify the reaction to a detected obstacle based on whether or not the vehicle is cornering and if it is in cornering, the degree of cornering (i.e., an easy, gradual corner versus a hard, sharp corner). Ride height adjustment may also be modified based on vehicle speed. Accordingly, controller 109 may also be coupled to a vehicle speed sensor 411 and/or a vehicle cornering sensor 413.

In at least one embodiment, the system's reaction to a detected obstacle varies based on weather conditions. For example, during periods of heavy rain or when there are icy/snowy conditions it may be imprudent to rapidly vary the ride height, or to vary the ride height unless the obstacle is large enough to guarantee significant vehicle damage. Accordingly, controller 109 may also be coupled to a precipitation sensor 415 and/or an external temperature sensor 417.

Figure 5:
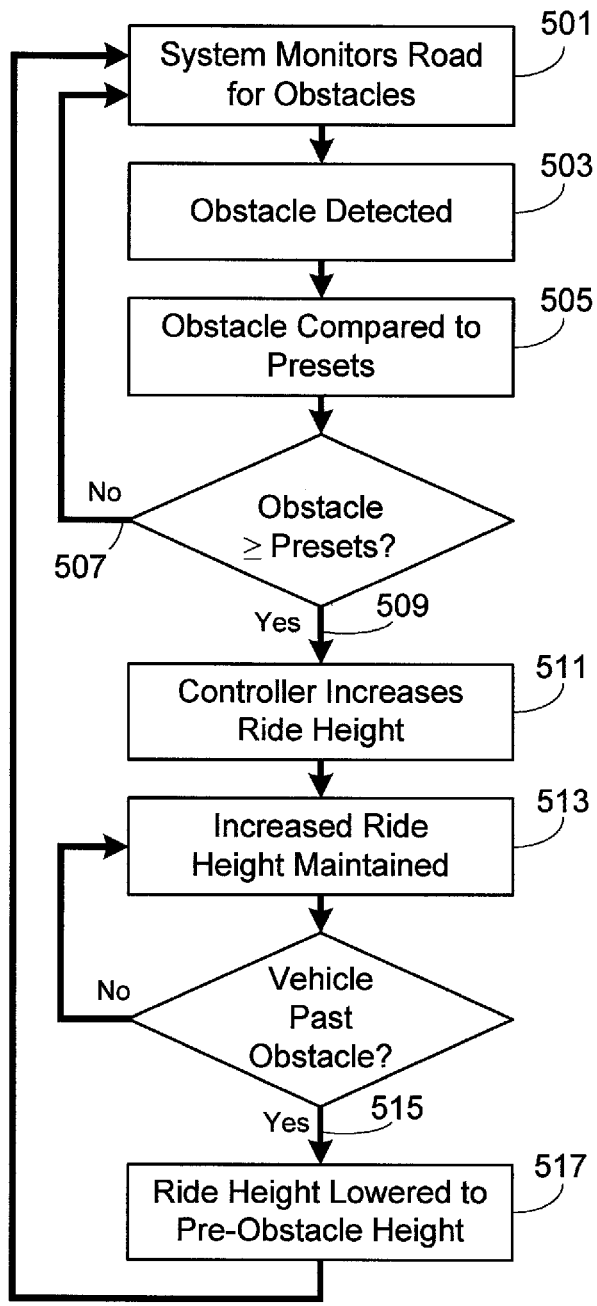
FIG. 5 illustrates the basic methodology of the invention in accordance with a preferred embodiment.

FIG. 5 illustrates the basis methodology of the invention in accordance with at least one embodiment of the invention. In this process the system continually monitors for any type of obstacle within the vehicle's pathway using sensor subsystem 119 (step 501). When the system detects an obstacle (step 503), the system compares the obstacle to a set of presets stored in memory 403 (step 505). Preferably the preset defines the height over which an obstacle is likely to impact the underside of the car. If the height of the detected obstacle above the surface of the road is less than the preset (step 507), then the system takes no further action and simply returns to monitoring the road ahead (step 501). If, on the other hand, the system determines that the height of the detected obstacle above the road surface is greater than the preset (step 509), then the system increases the ride height using the vehicle's air suspension system (step 511). The controller maintains the increased ride height (step 513) until the vehicle is past the obstacle (step 515). Once past the obstacle, controller 109 decreases the ride height of the vehicle to the pre-obstacle height (step 517).

Figure 6:
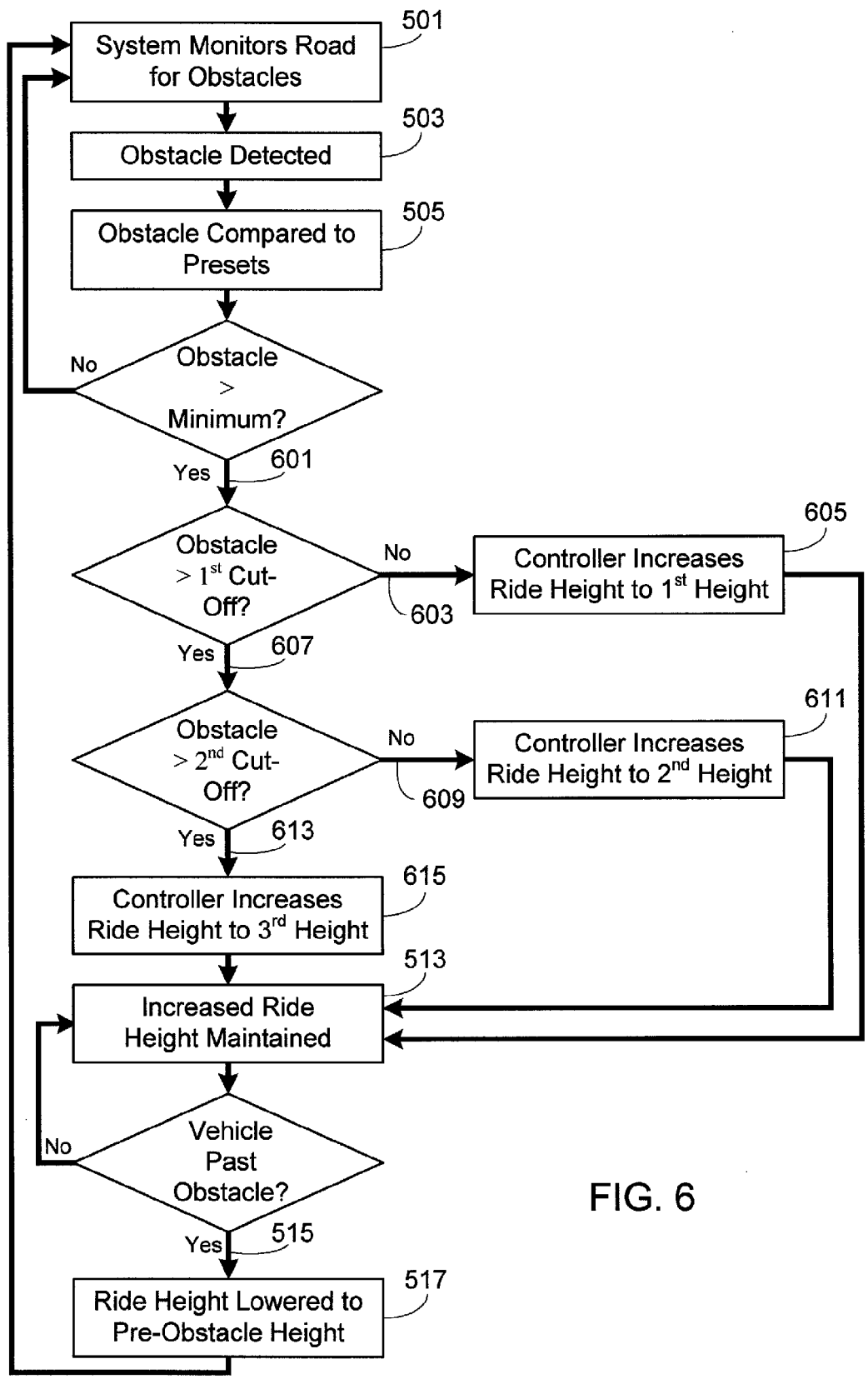
FIG. 6 illustrates a modified methodology in which the system raises the vehicle to a height based on the detected obstacle's height above the road surface.
Figure 7:
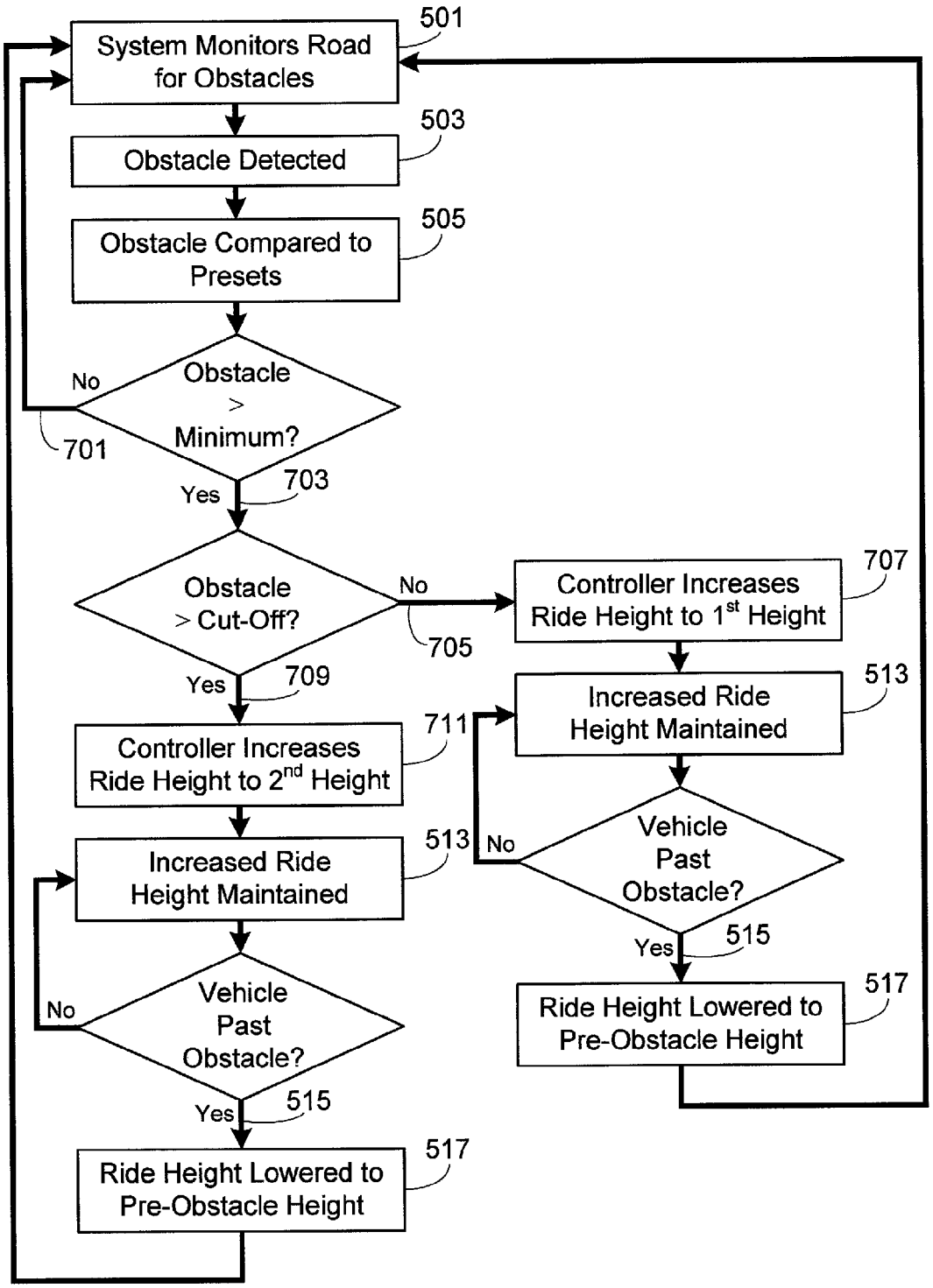
FIG. 7 illustrates a modified methodology based on that shown in FIG. 6.

FIGS. 6 and 7 illustrate modified reactive air suspension procedures based on the methodology shown in FIG. 5. In the modified procedures, the system controller 109 uses the dimensions of the obstacle determined by sensor subsystem 119 to determine the amount of height adjustment required to avoid the obstacle. In the process shown in FIG. 6, if the obstacle's height above the road surface is greater than a minimum size (step 601), but smaller than a first cut-off point (step 603), then the system increases the ride height to a first pre-defined height using the vehicle's air suspension system (step 605). If the system determines that the obstacle's height above the road surface is greater than the first cut-off point (step 607) but smaller than a second cut-off point (step 609), then the system increases the ride height to a second pre-defined height (step 611). If the system determines that the obstacle's height above the road surface is greater than the second cut-off point (step 613), then the system increases the ride height to a third pre-defined height, typically the maximum allowable pre-defined height (step 615). It should be understood that the system may use less than three pre-defined heights, for example comparing the obstacle's height only to a minimum and a single cut-off point as illustrated in FIG. 7. As shown, if the obstacle is less than the minimum, then no adjustment is made to the vehicle's height (step 701); alternately, if the obstacle is greater than the minimum (step 703) but less than the single cut-off point (step 705), then the controller adjusts the vehicle's height to a first pre-defined height (step 707); alternately, if the obstacle is greater than the cut-off point (step 709), then the controller adjusts the vehicle's height to a second pre-defined height (step 711). Similarly, it should be understood that the system may use more than the two pre-defined heights shown in FIG. 7, and more than the three pre-defined heights shown in FIG. 6.

While increasing vehicle height is an effective approach for avoiding, or at least mitigating, damage caused by passing over an obstacle, in some instances a rapid and possibly unexpected increase in vehicle height may be undesirable. For example, at very high speeds or when cornering a car at high speed through a tight corner, a sudden change in the vehicle's height may lead to driver error or may cause vehicle instability due to a change in vehicle aerodynamics/performance. Accordingly, in at least one embodiment of the invention, vehicle speed and/or the degree of vehicle cornering is monitored by controller 109 using sensors 411 and 413, respectively, thus allowing the system to modify the response to a detected obstacle. This aspect of the invention is illustrated in FIGS. 8-16. It should be understood that while the embodiments shown in FIGS. 8-16 are based on the methodology of FIG. 5, they are equally applicable to the methodologies shown in FIGS. 6 and 7.

Figure 8:
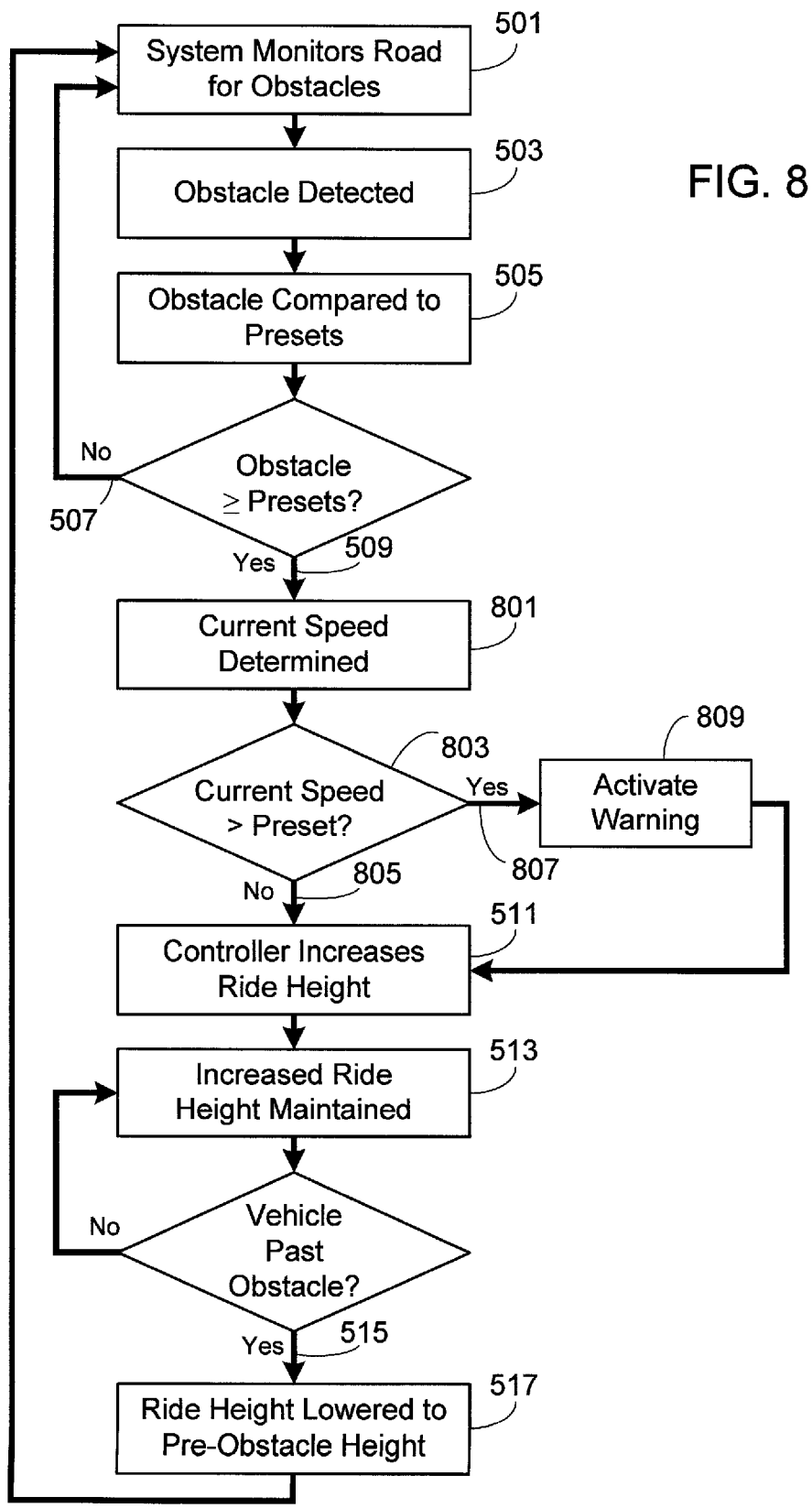
FIG. 8 illustrates a modified methodology based on that shown in FIG. 5, modified to activate a warning if the vehicle's speed is above a preset speed when an obstacle is detected.
Figure 9:
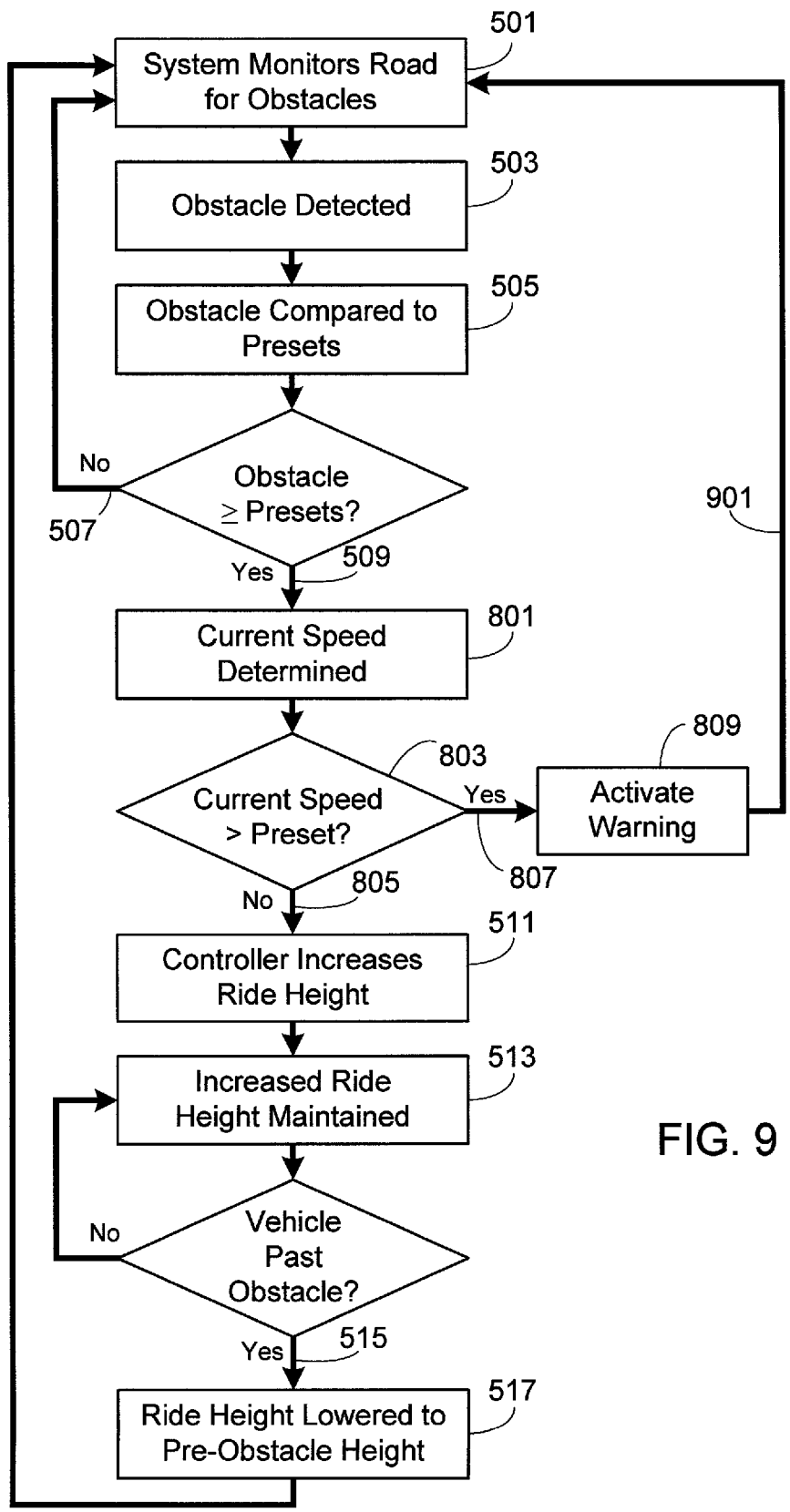
FIG. 9 illustrates a modified methodology based on that shown in FIG. 5, modified to activate a warning and prevent vehicle height adjustment if the vehicle's speed is above a preset speed when an obstacle is detected.
Figure 10:
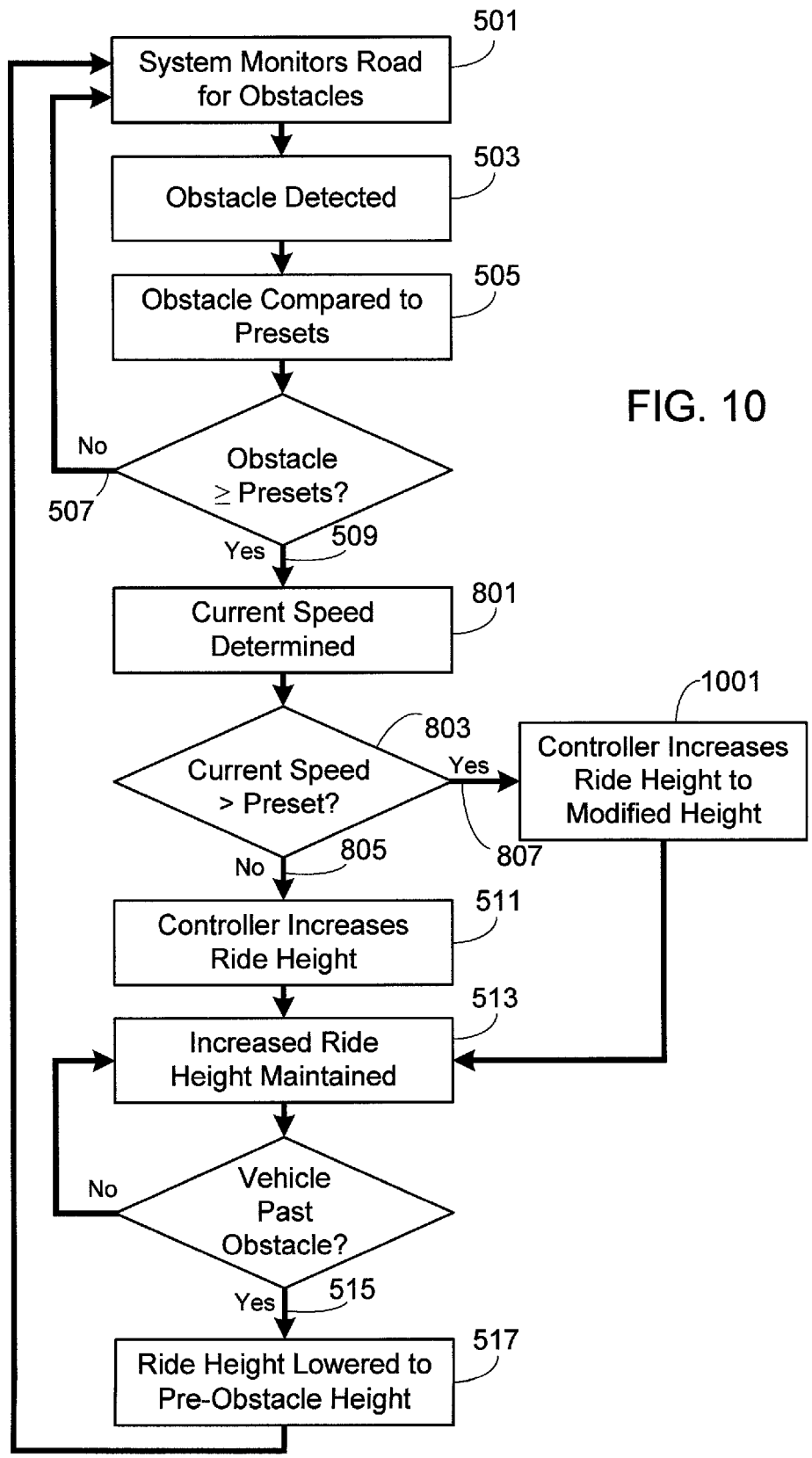
FIG. 10 illustrates a modified methodology based on that shown in FIG. 5 in which vehicle height adjustment is modified if the vehicle's speed is above a preset speed when an obstacle is detected.

In the embodiments illustrated in FIGS. 8-10, based on the methodology of FIG. 5, after an obstacle of sufficient size to warrant adjusting the vehicle's height is detected (step 509), controller 109 determines the vehicle's current speed using sensor 411 (step 801). The vehicle's current speed is then compared to a preset speed (step 803), where the preset speed has been input into the system by the manufacturer, a service representative of the manufacturer, a third party (e.g., service technician), or the user. If the vehicle's current speed is less than the preset speed (step 805), the controller modifies vehicle height (step 511) as previously described. In the embodiment illustrated in FIG. 8, if the vehicle's current speed is greater than the preset speed (step 807), the controller activates a warning (step 809) prior to, or at the same time as, the vehicle's ride height is modified (step 511). The warning may be a sound emitted over the vehicle's sound system or through a dedicated sound system. Alternately, the warning may be a visible warning shown on the user interface 117 or via an indicator located in the dashboard or instrument panel. In the embodiment illustrated in FIG. 9, if the vehicle's current speed is greater than the preset speed (step 807), the controller activates a warning (step 809) and bypasses the step of modifying vehicle height (step 901) until the vehicle's speed drops below the preset speed (step 805). In the embodiment illustrated in FIG. 10, if the vehicle's current speed is greater than the preset speed (step 807), the controller modifies the vehicle's height (1001), but to a lesser degree than it would be modified if the vehicle's current speed was less than the preset speed. Although not shown, it should be understood that the embodiment illustrated in FIG. 10 may also include the step of activating a warning indicator as previously described when the vehicle's current speed exceeds the preset speed.

Figure 11:
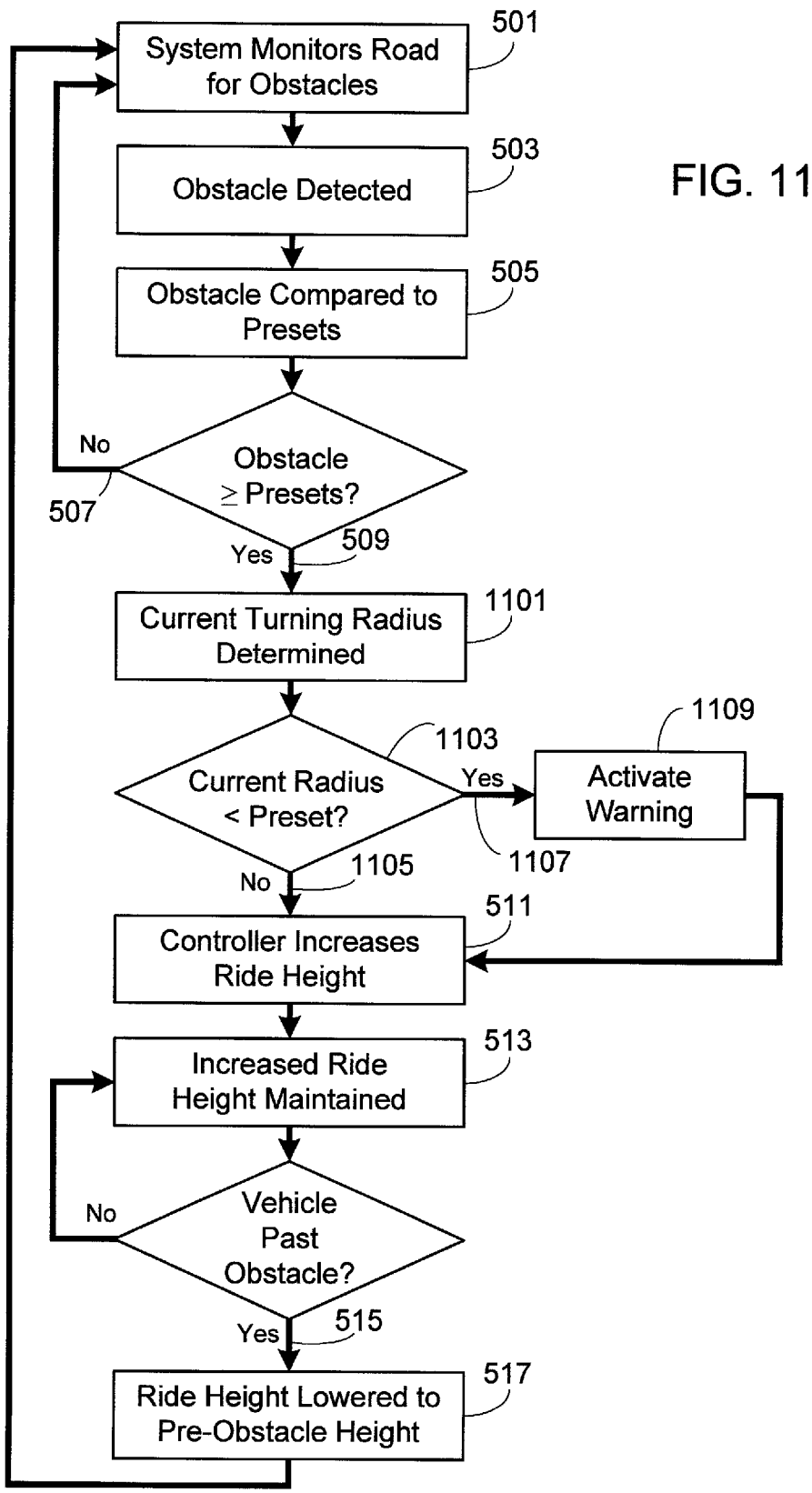
FIG. 11 illustrates a modified methodology based on that shown in FIG. 5, modified to activate a warning if the vehicle's turning radius is less than a preset value when an obstacle is detected.
Figure 12:
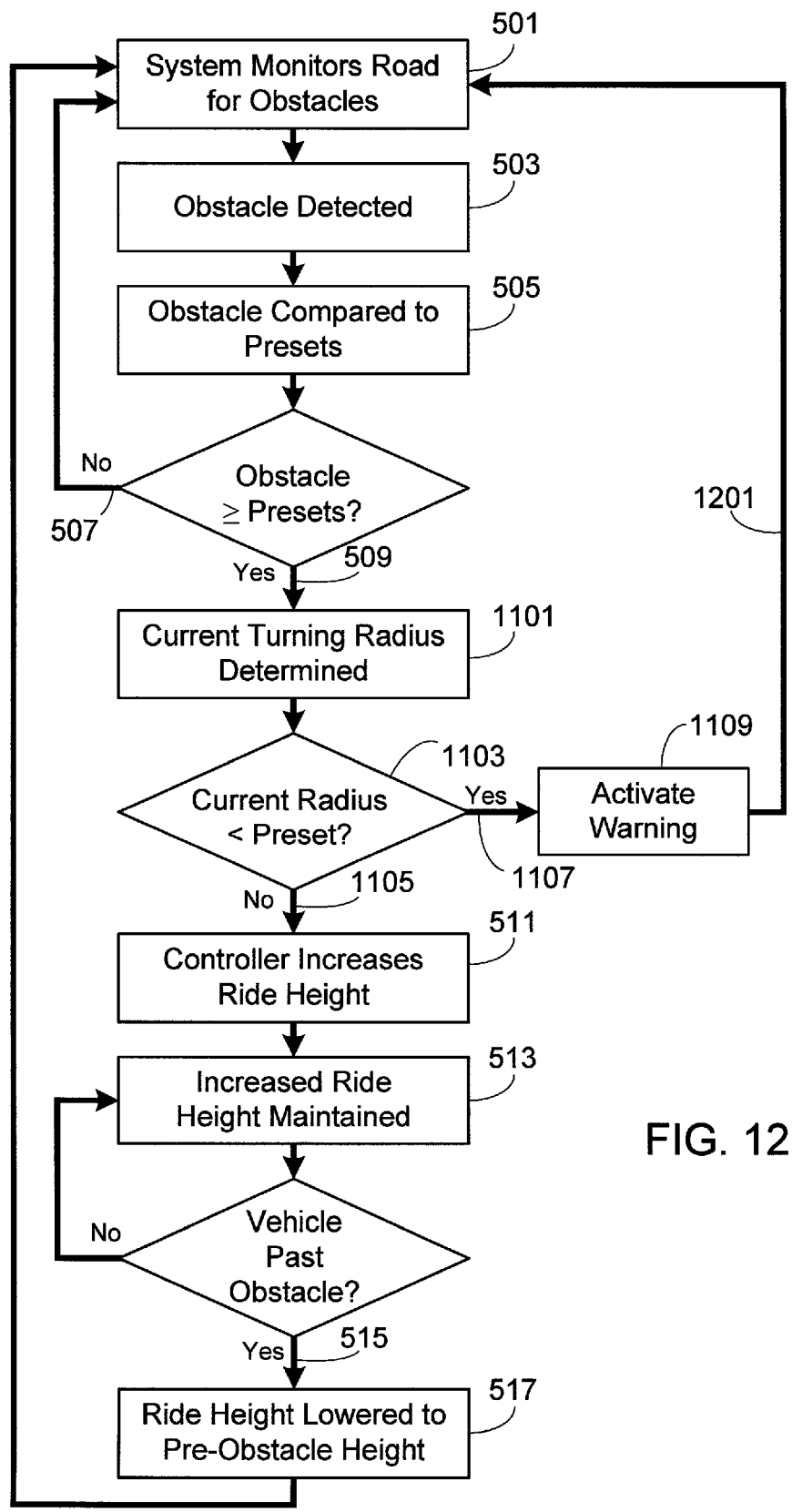
FIG. 12 illustrates a modified methodology based on that shown in FIG. 5, modified to activate a warning and prevent vehicle height adjustment if the vehicle's turning radius is less than a preset value when an obstacle is detected.
Figure 13:
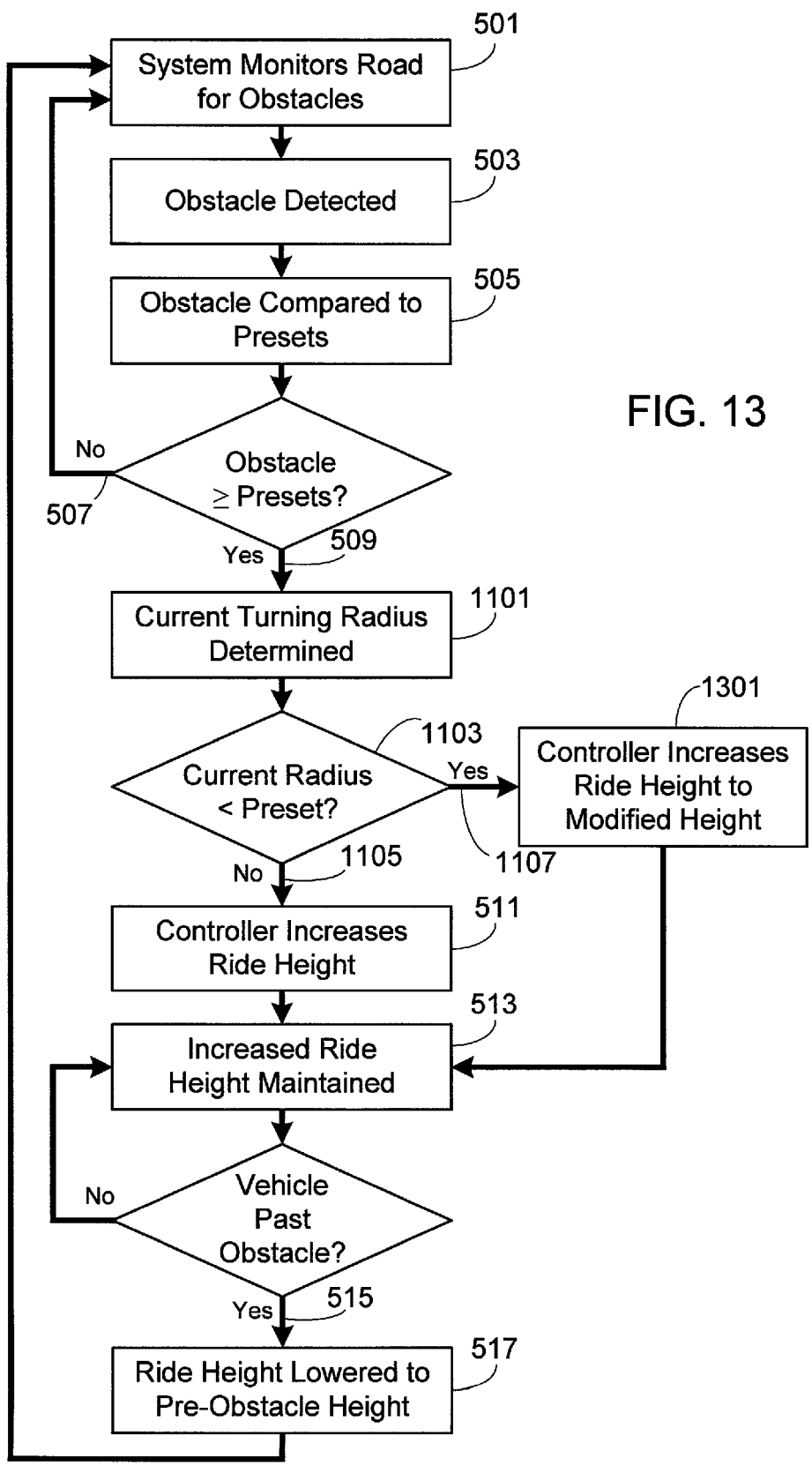
FIG. 13 illustrates a modified methodology based on that shown in FIG. 5 in which vehicle height adjustment is modified if the turning radius is less than a preset value when an obstacle is detected.

In the embodiments illustrated in FIGS. 11-13, after an obstacle of sufficient size to warrant adjusting the vehicle's height is detected (step 509), controller 109 determines how hard the vehicle is currently turning using sensor 413 (step 801). Sensor 413 may monitor steering wheel position, wheel position or some other metric to determine the vehicle's current turning radius. After determining the vehicle's current turning radius (step 1101), controller 109 compares this radius to a preset value (step 1103), where the preset value has been input into the system by the manufacturer, a service representative of the manufacturer, a third party (e.g., service technician), or the user. If the vehicle's current turning radius is greater than the preset value (step 1105), the controller modifies vehicle height (step 511) as previously described. In the embodiment illustrated in FIG. 11, if the vehicle's current turning radius is less than the preset value (step 1107), the controller activates a warning (step 1109) prior to, or at the same time as, the vehicle's ride height is modified (step 511). As previously noted, the warning may be an audible sound or a visual indicator. In the embodiment illustrated in FIG. 12, if the vehicle's current turning radius is less than the preset value (step 1107), the controller activates a warning (step 1109) and bypasses the step of modifying vehicle height (step 1201) until the vehicle's turning radius increases above the preset value (step 1105). In the embodiment illustrated in FIG. 13, if the vehicle's current turning radius is less than the preset value (step 1107), the controller modifies the vehicle's height (1301), but to a lesser degree than it would be modified if the vehicle's current turning radius was greater than the preset value. Although not shown, it should be understood that the embodiment illustrated in FIG. 13 may also include the step of activating a warning indicator as previously described when the vehicle's current turning radius is less than the preset turning radius.

Figure 14:
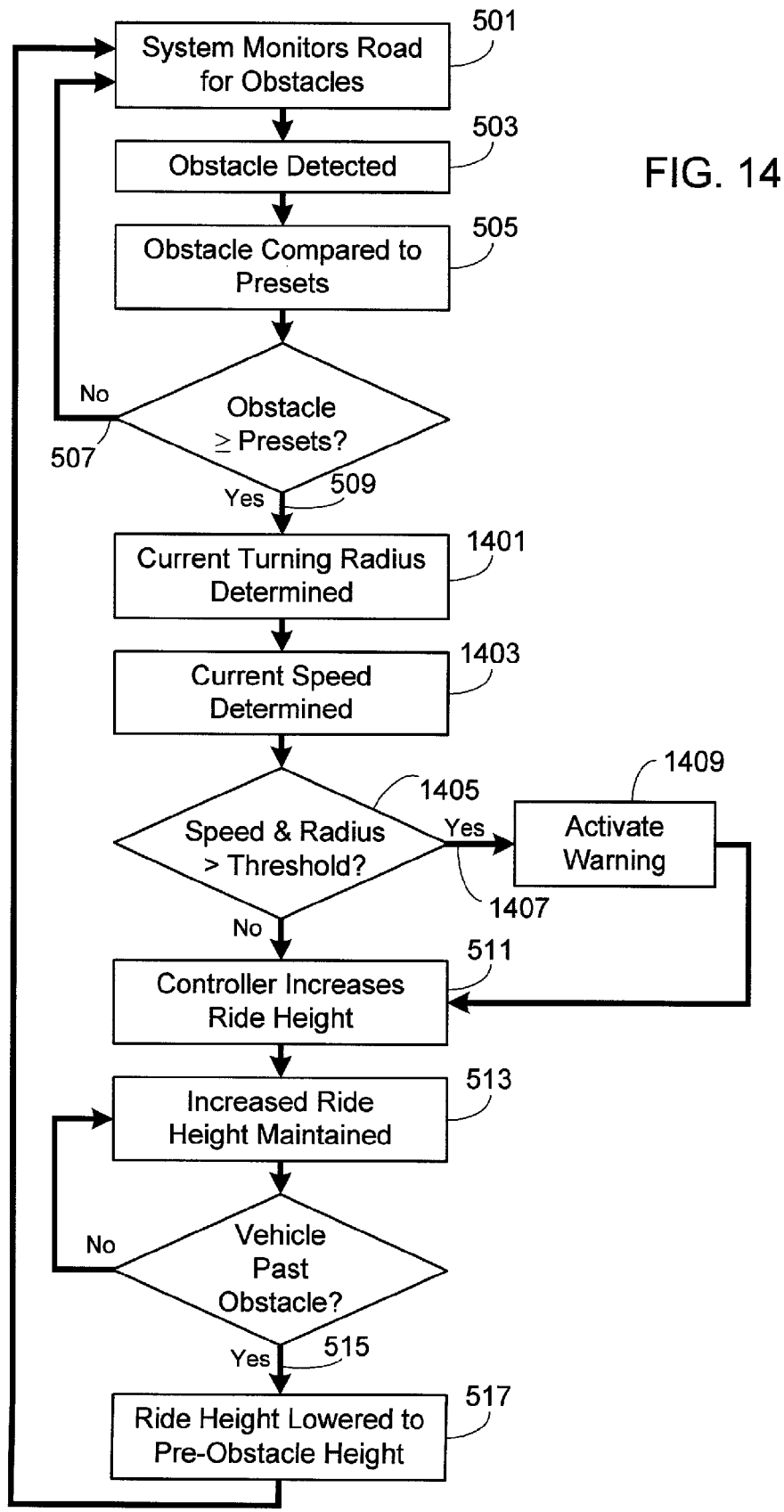
FIG. 14 illustrates a modified methodology based on that shown in FIG. 5, modified to activate a warning if the combination of the vehicle's speed and turning radius is above a preset threshold value when an obstacle is detected.
Figure 15:
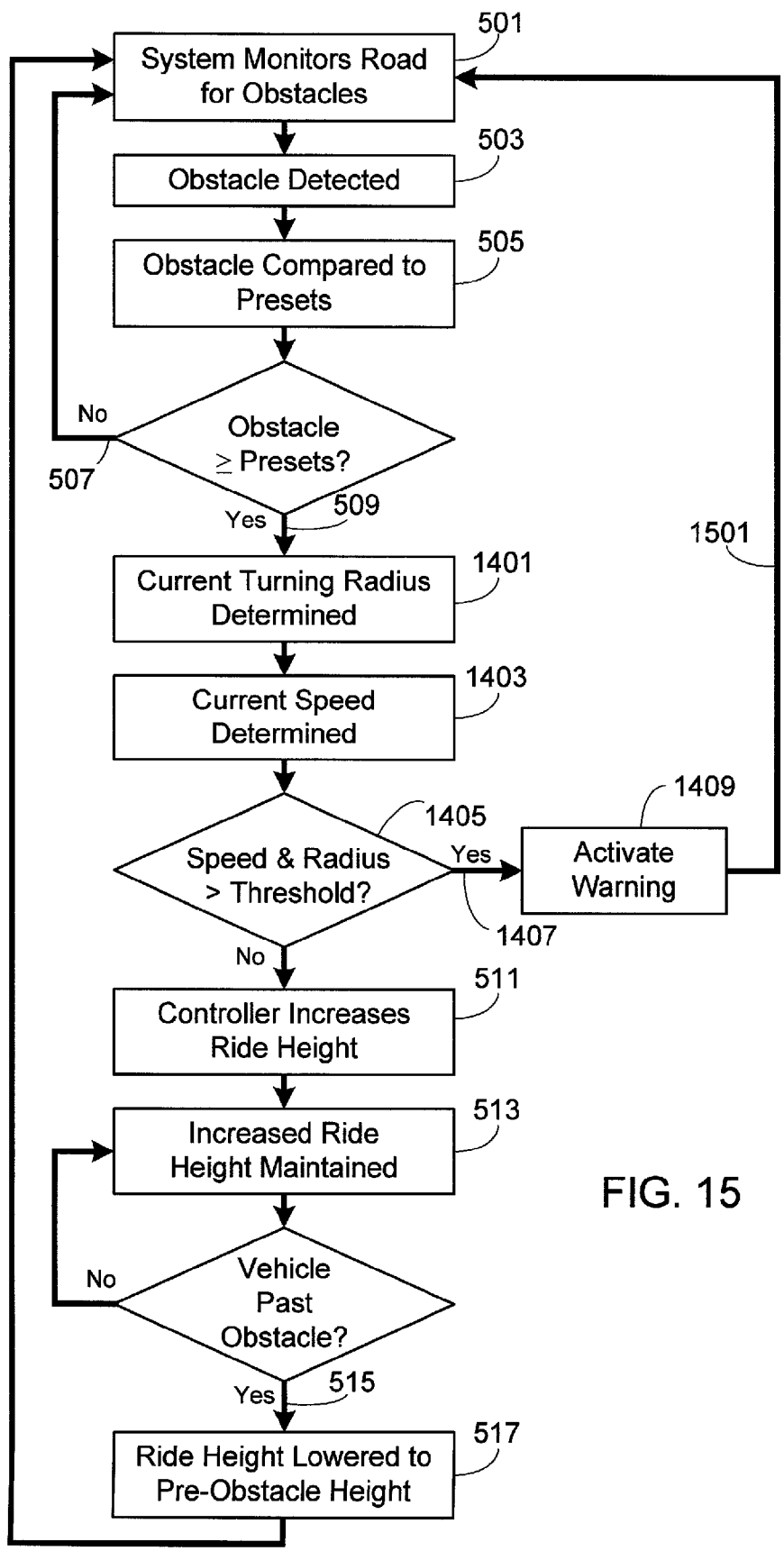
FIG. 15 illustrates a modified methodology based on that shown in FIG. 5, modified to activate a warning and prevent vehicle height adjustment if the combination of the vehicle's speed and turning radius is above a preset threshold value when an obstacle is detected.
Figure 16:
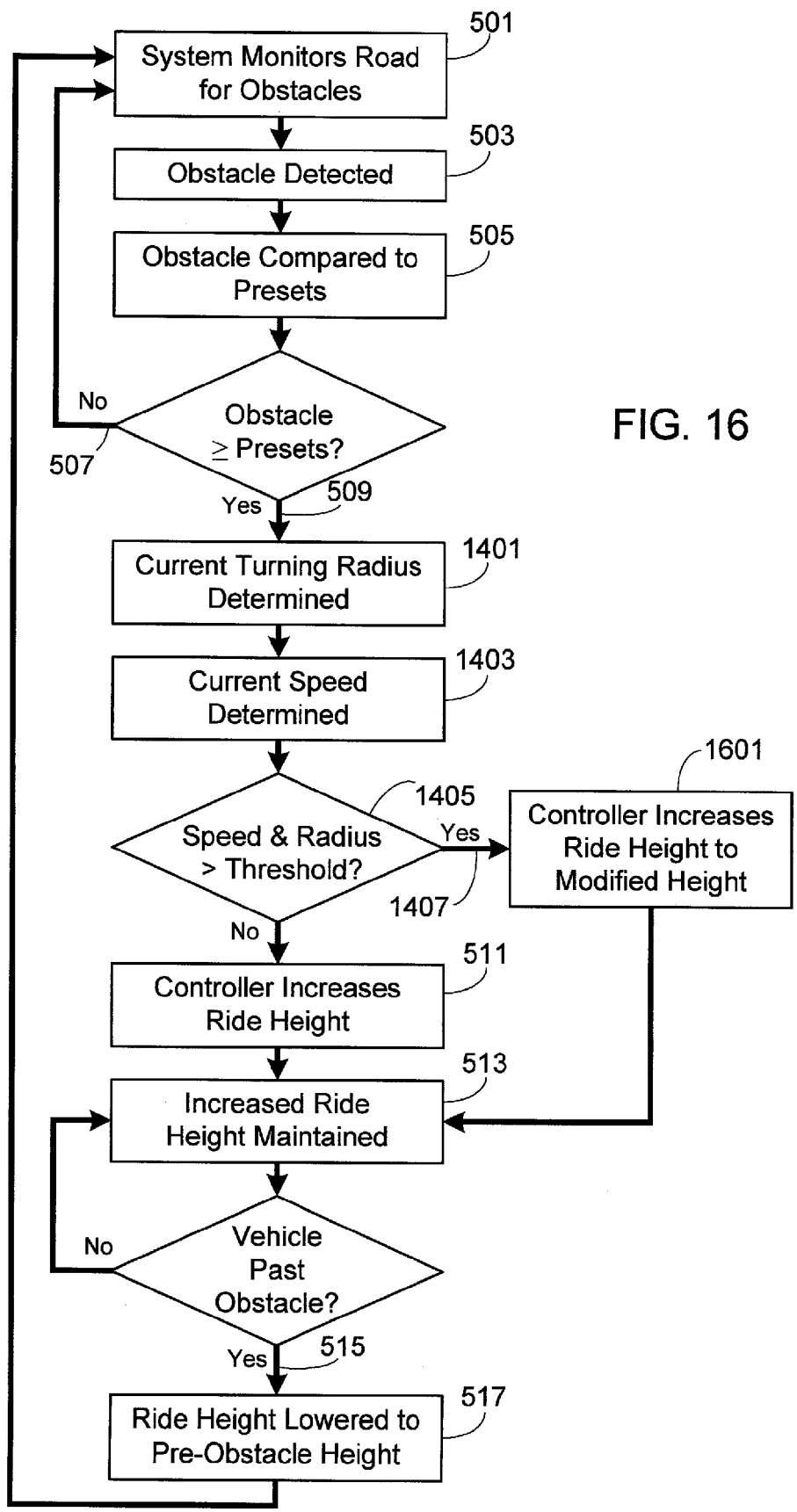
FIG. 16 illustrates a modified methodology based on that shown in FIG. 5 in which vehicle height adjustment is modified if the combination of the vehicle's speed and turning radius is above a preset threshold value when an obstacle is detected.

In the embodiments illustrated in FIGS. 14-16, after an obstacle of sufficient size to warrant adjusting the vehicle's height is detected (step 509), controller 109 determines the vehicle's current turning radius (step 1401) and speed (step 1403) using sensors 413 and 411, respectively. Preferably using a look-up table stored in memory 403, controller 109 determines whether the combination of the vehicle's speed and turning radius falls below a threshold value (step 1405). If the combination does fall below the threshold value, the controller modifies vehicle height (step 511) as previously described. If the combination is greater than the threshold value (step 1407), the controller activates a warning (step 1409) prior to, or at the same time as, the vehicle's ride height is modified (step 511). As previously noted, the warning may be an audible sound or a visual indicator. In the embodiment illustrated in FIG. 15, if the combination of the vehicle's speed and turning radius is greater than the threshold value (step 1407), the controller activates a warning (step 1409) and bypasses the step of modifying vehicle height (step 1501) until the combination of the vehicle's speed and turning radius falls below the threshold value (step 1405). In the embodiment illustrated in FIG. 16, if the combination of the vehicle's speed and turning radius is greater than the threshold value (step 1407), the controller modifies the vehicle's height (1601), but to a lesser degree than it would be modified if the combination fell below the threshold value. It should be understood that rather than monitoring turning radius and vehicle speed, the vehicle's lateral force can be directly monitored and compared to a preset value, thereby achieving the same result. Although not shown, it should also be understood that the embodiment illustrated in FIG. 16 may also include the step of activating a warning indicator as previously described when the combination of the vehicle's speed and turning radius is greater than the threshold value.

The inventors have found that when a detected obstacle is formed of accumulated snow, it is generally preferable to drive over the obstacle rather than to raise the vehicle to avoid the snow. Accordingly, in at least one embodiment the system attempts to determine if the detected obstacle is comprised of snow and if it is, to bypass or otherwise modify the step of increasing vehicle ride height. FIGS. 17-20 illustrate exemplary embodiments of such a configuration based on the methodology shown in FIG. 5. It should be understood that the process of determining likely obstacle composition and bypassing or otherwise modifying the step of increasing vehicle ride height may be combined with other embodiments, for example those in which ride height is varied in response to obstacle size (e.g., the processes illustrated in FIGS. 6 and 7); those in which vehicle speed is taken into account in determining an appropriate course of action when an obstacle is detected (e.g., the processes illustrated in FIGS. 8-10); those in which vehicle turning radius is taken into account in determining an appropriate course of action when an obstacle is detected (e.g., the processes illustrated in FIGS. 11-13); and those in which both vehicle speed and turning radius are taken into account in determining an appropriate course of action when an obstacle is detected (e.g., the processes illustrated in FIGS. 14-16).

Figure 17:
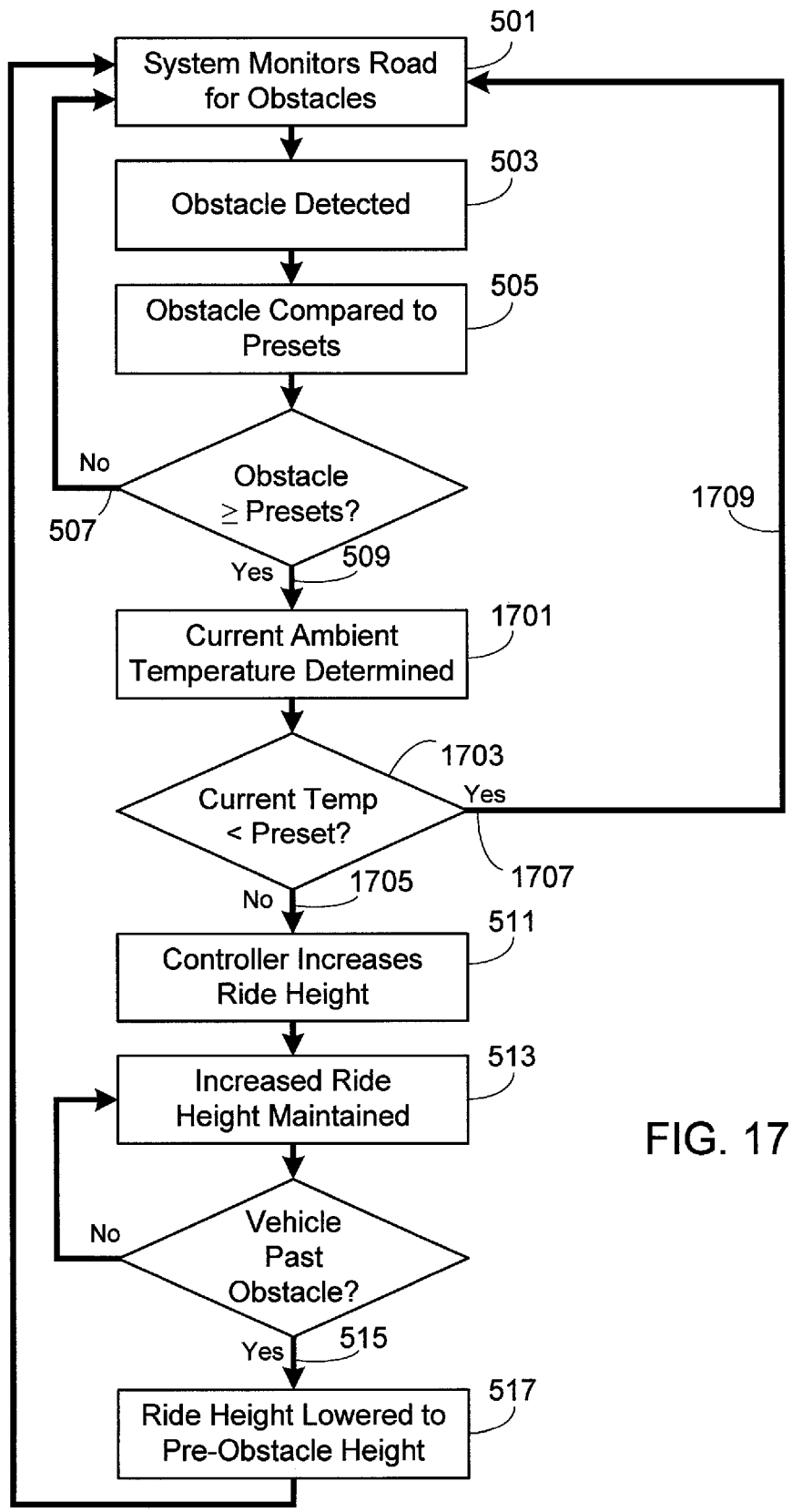
FIG. 17 illustrates a modified methodology based on that shown in FIG. 5, modified to bypass vehicle height adjustment if the ambient temperature is less than a preset temperature.
Figure 18:
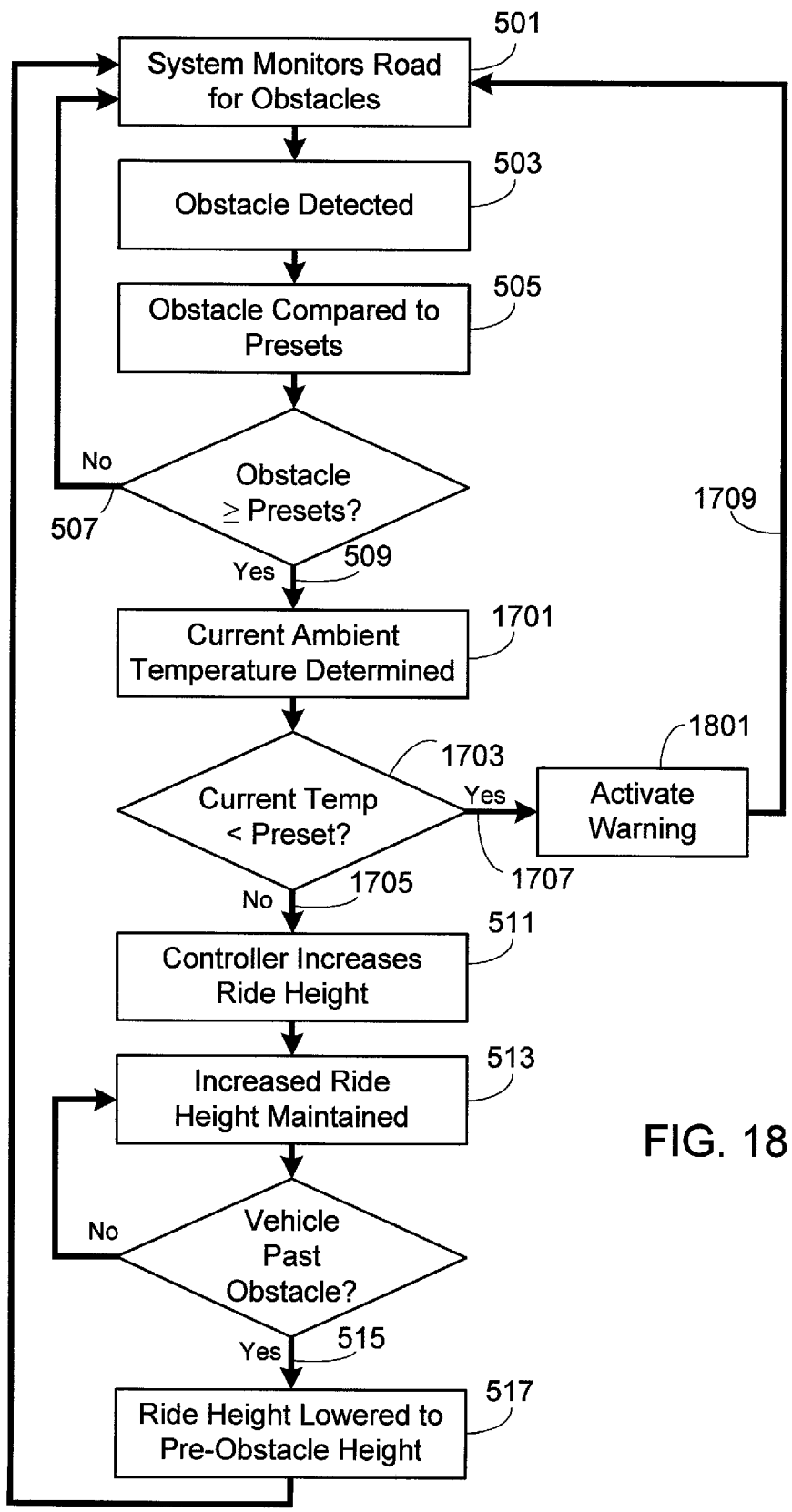
FIG. 18 illustrates a modified methodology based on that shown in FIG. 5, modified to activate a warning and bypass vehicle height adjustment if the ambient temperature is less than a preset temperature.
Figure 19:
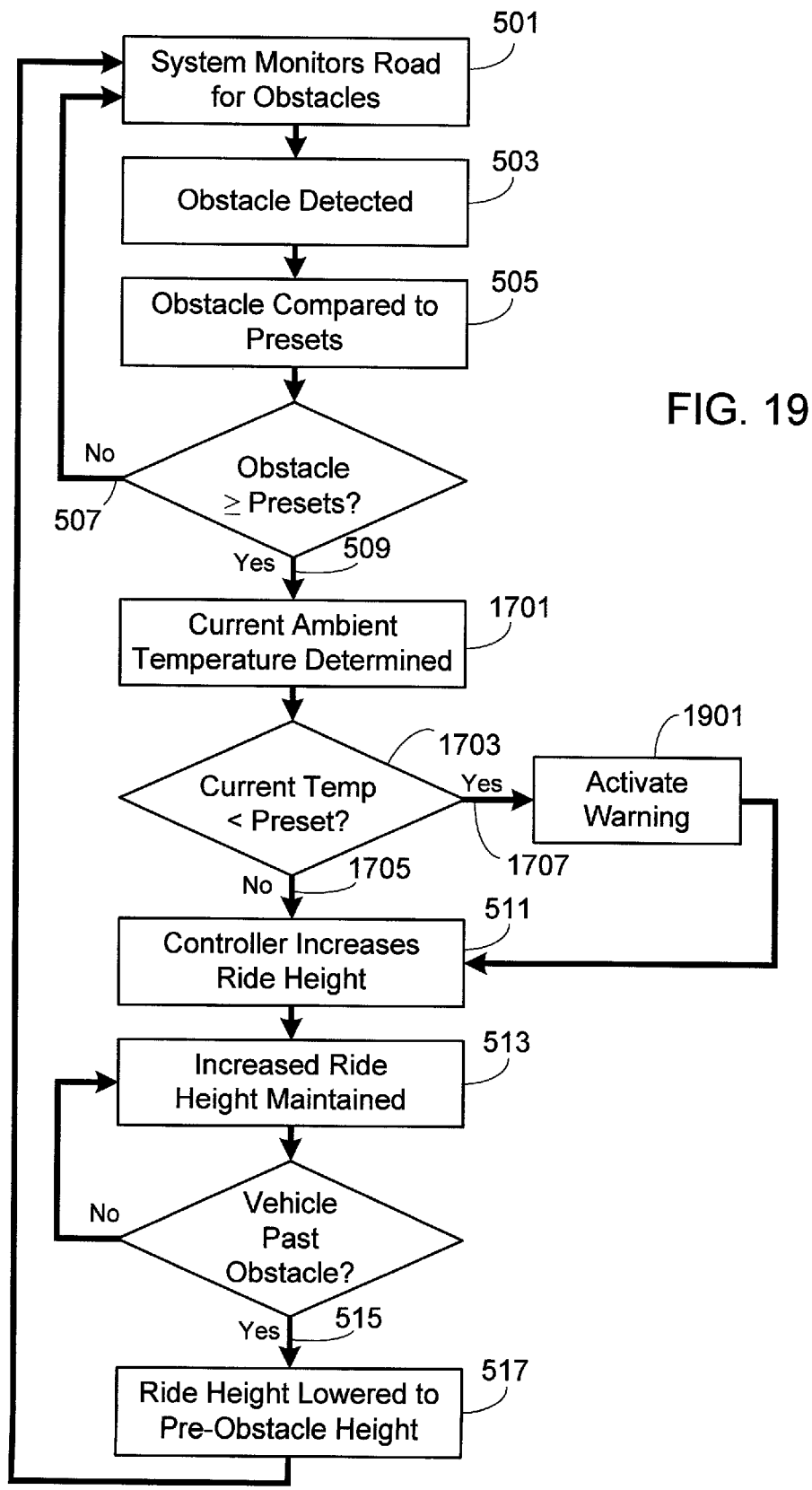
FIG. 19 illustrates a modified methodology based on that shown in FIG. 5, modified to activate a warning if the ambient temperature is less than a preset temperature.
Figure 20:
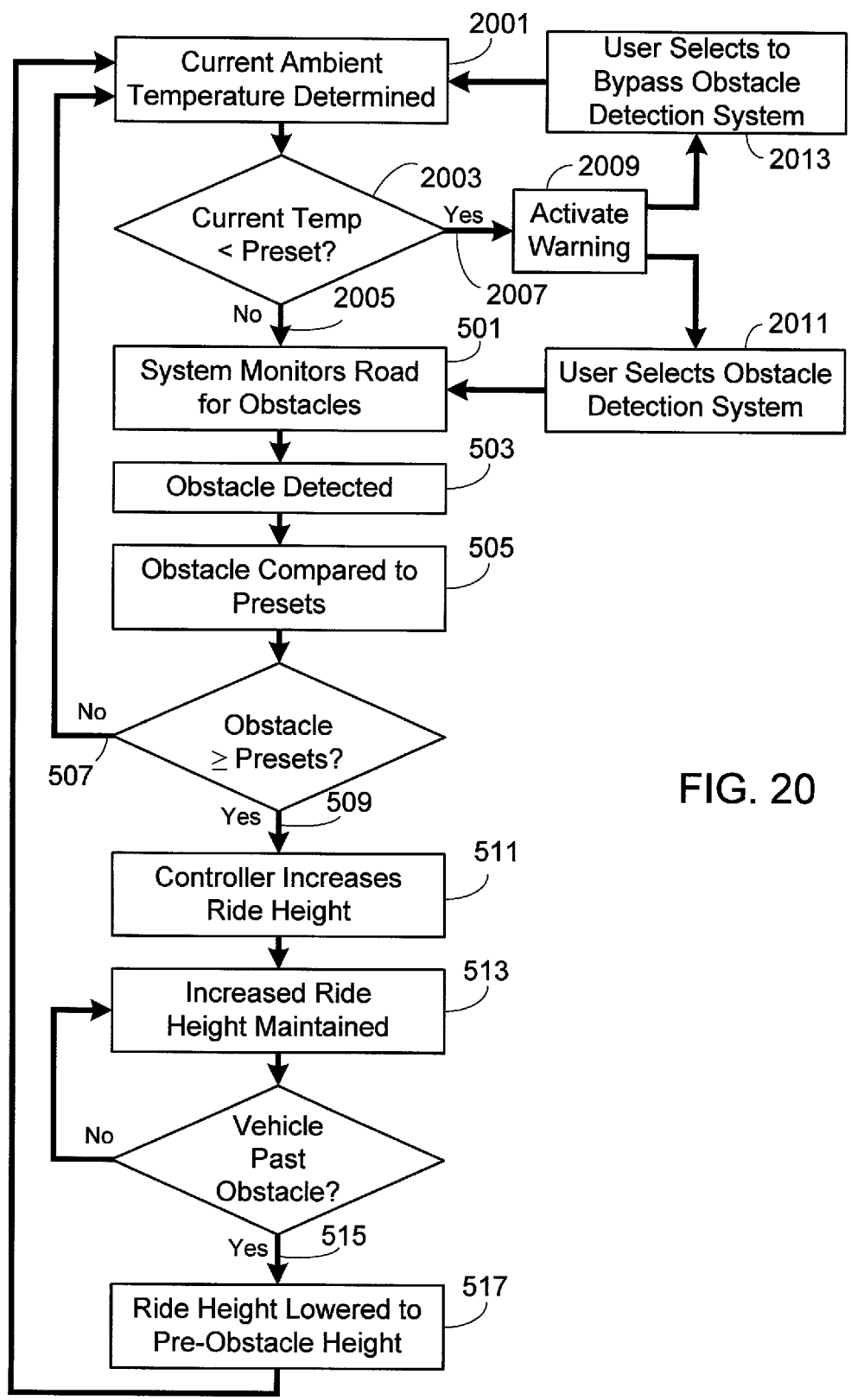
FIG. 20 illustrates a modified methodology based on that shown in FIG. 5, modified to monitor ambient temperature and if the temperature is less than a preset temperature, activate a warning and either bypass obstacle detection or allow obstacle detection based on a user selection.

In the embodiments illustrated in FIGS. 17-19, after an obstacle of sufficient size to warrant adjusting the vehicle's height is detected (step 509), controller 109 determines the current ambient temperature (step 1701) using sensor 417. While these embodiments may also determine precipitation levels using sensor 415, the inventors have found that monitoring precipitation levels is generally not a valid indicator since obstacles comprised of snow may have accumulated for days or weeks after a snow storm has ended. In step 1703 the detected temperature is compared to a preset temperature, typically 32° F./0° C., where the preset temperature has been input into the system by the manufacturer, a service representative of the manufacturer, a third party (e.g., service technician), or the user. If the current ambient temperature is greater than the preset temperature (step 1705), the controller modifies vehicle height (step 511) as previously described. In the embodiment illustrated in FIG. 17, if the current ambient temperature is less than the preset temperature (step 1707), the controller bypasses the step of modifying vehicle height (step 1709) until the current ambient temperature rises above the preset temperature (step 1705). In the embodiment illustrated in FIG. 18, if the current ambient temperature is less than the preset temperature (step 1707), in addition to bypassing the step of modifying vehicle height until the current ambient temperature rises above the preset temperature as shown in FIG. 17, the controller activates a warning (step 1801). As previously noted, the warning may be an audible sound or a visual indicator. In the embodiment illustrated in FIG. 19, if the current ambient temperature is less than the preset temperature (step 1707), the controller activates a warning (step 1901) prior to, or at the same time as, the vehicle's ride height is modified (step 511). In the embodiment illustrated in FIG. 20, controller 109 determines the current ambient temperature (step 2001) and compares that temperature to the preset temperature, typically 32° F./0° C. (step 2003), before an obstacle is even detected. If the current ambient temperature is greater than the preset temperature (step 2005), the process continues as described above. If the current ambient temperature is less than the preset temperature (step 2007), the controller activates either an audible or a visual warning indicator (step 2009) as previously described. At this juncture the user can either choose to continue use of the obstacle detection and ride height adjustment process (step 2011), or choose to discontinue use of the obstacle detection and ride height adjustment process (step 2013) until the ambient temperature rises above the preset temperature. The user selection may be input via user interface 117 or via other means such as a switch.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An obstacle avoidance system, comprising:
    an obstacle sensor mounted to a vehicle, wherein said obstacle sensor outputs a control signal when said obstacle sensor detects an obstacle in front of said vehicle;
    an air suspension system coupled to said vehicle, said air suspension system comprising:
        a plurality of air springs comprising at least one air spring per wheel of said vehicle, wherein said plurality of air springs are configured to provide a range of vehicle ride heights ranging from a minimum ride height to a maximum ride height, wherein said plurality of air springs provide said range of vehicle ride heights in response to changes in an air pressure within each of said plurality of air springs;
        an air supply system coupled to each of said plurality of air springs; and
        a control valve system, said control valve system controlling said air pressure within each of said plurality of air springs; and
    a controller coupled to said obstacle sensor and said control valve system, said controller configured to (i) determine if said obstacle detected by said obstacle sensor is large enough to interfere with said vehicle during forward motion of said vehicle, (ii) automatically adjust said control valve system and increase said vehicle ride height in response to said control signal when said obstacle is large enough to interfere with said vehicle during forward motion of said vehicle unless said vehicle ride height is currently set at said maximum ride height, and (iii) bypassing automatically increasing said vehicle ride height when said obstacle is not large enough to interfere with said vehicle during forward motion of said vehicle.

2. The obstacle avoidance system of claim 1, said air supply system further comprising:
    at least one pressurized air supply tank coupled to said plurality of air springs; and
    an air compressor coupled to said at least one pressurized air supply tank.

3. The obstacle avoidance system of claim 2, said at least one pressurized air supply tank further comprising a single pressurized air supply tank coupled to each of said plurality of air springs.

4. The obstacle avoidance system of claim 2, said at least one pressurized air supply tank further comprising a first pressurized air supply tank and a second pressurized air supply tank, said first pressurized air supply tank coupled to a first air spring and a second air spring of said plurality of air springs, and said second pressurized air supply tank coupled to a third air spring and a fourth air spring of said plurality of air springs.

5. The obstacle avoidance system of claim 2, said at least one pressurized air supply tank further comprising a first pressurized air supply tank coupled to a first air spring of said plurality of air springs, a second pressurized air supply tank coupled to a second air spring of said plurality of air springs, a third pressurized air supply tank coupled to a third air spring of said plurality of air springs, and a fourth pressurized air supply tank coupled to a fourth air spring of said plurality of air springs.

6. The obstacle avoidance system of claim 1, wherein said obstacle sensor outputs a first control signal when said obstacle is less than a first preset size and outputs a second control signal when said obstacle is greater than said first preset size, and wherein when said obstacle is large enough to interfere with said vehicle during forward motion of said vehicle said controller increases said vehicle ride height to a first ride height in response to said first control signal and to a second ride height in response to said second control signal.

7. The obstacle avoidance system of claim 1, further comprising an audible warning indicator coupled to said controller.

8. The obstacle avoidance system of claim 7, further comprising a vehicle speed sensor coupled to said controller, wherein said vehicle speed sensor monitors a current vehicle speed, and wherein said controller automatically activates said audible warning indicator in response to said control signal when said current vehicle speed is in excess of a preset speed.

9. The obstacle avoidance system of claim 8, wherein said controller is configured to bypass adjustment of said control valve system when said current vehicle speed is in excess of said preset speed.

10. The obstacle avoidance system of claim 7, further comprising a vehicle turning radius sensor coupled to said controller, wherein said vehicle turning radius sensor monitors a current vehicle turning radius, and wherein said controller automatically activates said audible warning indicator in response to said control signal when said current vehicle turning radius is in excess of a preset value.

11. The obstacle avoidance system of claim 10, wherein said controller is configured to bypass adjustment of said control valve system when said current vehicle turning radius is in excess of said preset value.

12. The obstacle avoidance system of claim 7, further comprising a vehicle speed sensor coupled to said controller and a vehicle turning radius sensor coupled to said controller, wherein said vehicle speed sensor monitors a current vehicle speed, wherein said vehicle turning radius sensor monitors a current vehicle turning radius, and wherein said controller automatically activates said audible warning indicator in response to said control signal when a combination of said current vehicle speed and said current vehicle turning radius exceeds a threshold value.

13. The obstacle avoidance system of claim 12, wherein said controller is configured to bypass adjustment of said control valve system when said combination of said current vehicle speed and said current vehicle turning radius exceeds said threshold value.

14. The obstacle avoidance system of claim 7, further comprising an ambient temperature sensor coupled to said controller, wherein said ambient temperature sensor monitors a current ambient temperature, and wherein said controller automatically activates said audible warning indicator in response to said control signal when said current ambient temperature is lower than a preset temperature.

15. The obstacle avoidance system of claim 14, wherein said controller is configured to bypass adjustment of said control valve system when said ambient temperature is lower than said preset temperature.

16. The obstacle avoidance system of claim 1, further comprising a visual warning indicator coupled to said controller.

17. The obstacle avoidance system of claim 16, further comprising a vehicle speed sensor coupled to said controller, wherein said vehicle speed sensor monitors a current vehicle speed, and wherein said controller automatically activates said visual warning indicator in response to said control signal when said current vehicle speed is in excess of a preset speed.

18. The obstacle avoidance system of claim 17, wherein said controller is configured to bypass adjustment of said control valve system when said current vehicle speed is in excess of said preset speed.

19. The obstacle avoidance system of claim 16, further comprising a vehicle turning radius sensor coupled to said controller, wherein said vehicle turning radius sensor monitors a current vehicle turning radius, and wherein said controller automatically activates said visual warning indicator in response to said control signal when said current vehicle turning radius is in excess of a preset value.

20. The obstacle avoidance system of claim 19, wherein said controller is configured to bypass adjustment of said control valve system when said current vehicle turning radius is in excess of said preset value.

21. The obstacle avoidance system of claim 16, further comprising a vehicle speed sensor coupled to said controller and a vehicle turning radius sensor coupled to said controller, wherein said vehicle speed sensor monitors a current vehicle speed, wherein said vehicle turning radius sensor monitors a current vehicle turning radius, and wherein said controller automatically activates said visual warning indicator in response to said control signal when a combination of said current vehicle speed and said current vehicle turning radius exceeds a threshold value.

22. The obstacle avoidance system of claim 21, wherein said controller is configured to bypass adjustment of said control valve system when said combination of said current vehicle speed and said current vehicle turning radius exceeds said threshold value.

23. The obstacle avoidance system of claim 16, further comprising an ambient temperature sensor coupled to said controller, wherein said ambient temperature sensor monitors a current ambient temperature, and wherein said controller automatically activates said visual warning indicator in response to said control signal when said current ambient temperature is lower than a preset temperature.

24. The obstacle avoidance system of claim 23, wherein said controller is configured to bypass adjustment of said control valve system when said ambient temperature is lower than said preset temperature.

\* \* \* \* \*